(12) United States Patent
Curran et al.

(10) Patent No.: US 9,583,822 B2
(45) Date of Patent: Feb. 28, 2017

(54) BROAD BAND RADOME FOR MICROWAVE ANTENNA

(71) Applicant: CommScope Technologies LLC, Hickory, NC (US)

(72) Inventors: John S. Curran, Kirkcaldy (GB); Ian Renilson, Dalgety Bay (GB); Alastair D Wright, Edinburgh (GB); Matthew Robert Lewry, Limekilns (GB); Sharon Mackay, Kirkcaldy (GB)

(73) Assignee: CommScope Technologies LLC, Hickory, NC (US)

( * ) Notice: Subject to any disclaimer, the term of this patent is extended or adjusted under 35 U.S.C. 154(b) by 314 days.

(21) Appl. No.: 14/066,755

(22) Filed: Oct. 30, 2013

(65) Prior Publication Data

US 2015/0116184 A1    Apr. 30, 2015

(51) Int. Cl.
*H01Q 1/42*     (2006.01)
*H01Q 15/16*    (2006.01)
*B29C 44/12*    (2006.01)
*B29K 105/04*   (2006.01)
*B29L 31/34*    (2006.01)
*B29K 101/12*   (2006.01)

(52) U.S. Cl.
CPC .......... *H01Q 1/42* (2013.01); *B29C 44/1271* (2013.01); *H01Q 15/16* (2013.01); *B29K 2101/12* (2013.01); *B29K 2105/04* (2013.01); *B29L 2031/3456* (2013.01)

(58) Field of Classification Search
None
See application file for complete search history.

(56) References Cited

U.S. PATENT DOCUMENTS

| | | |
|---|---|---|
| 2,614,059 A | 10/1952 | Cooper |
| 3,002,190 A | 9/1961 | Oleesky et al. |
| 4,620,890 A | 11/1986 | Myers et al. |
| 4,896,164 A | 1/1990 | Burke et al. |
| 4,980,696 A * | 12/1990 | Stone ............... H01Q 1/424 343/872 |
| 5,323,170 A | 6/1994 | Lang |
| 5,408,244 A | 4/1995 | Mackenzie |
| 5,457,471 A | 10/1995 | Epperson, Jr. |
| 5,662,293 A | 9/1997 | Hower et al. |
| 5,845,391 A | 12/1998 | Bellus et al. |
| 5,849,234 A | 12/1998 | Harrison et al. |
| 6,107,976 A | 8/2000 | Purinton |
| 6,184,842 B1 | 2/2001 | Leinweber et al. |
| 6,375,779 B1 | 4/2002 | Melquist et al. |

(Continued)

OTHER PUBLICATIONS

Sung Chul Kang, International Search Report for PCT application PCT/US2014/063020, Feb. 26, 2015, Korean Intellectual Property Office, Daejeon Metropolitan City, Republic of Korea.

(Continued)

*Primary Examiner* — Robert Karacsony
(74) *Attorney, Agent, or Firm* — Myers Bigel, P.A.

(57) ABSTRACT

A radome for an antenna is provided as a composite of an isotropic outer layer and a structural layer of foamed polymer material. The composite is dimensioned to enclose an open end of the antenna. The radome may be retained upon the antenna by a retaining element and fasteners. The outer layer may be a polymer material with a water resistant characteristic.

20 Claims, 15 Drawing Sheets

(56) References Cited

U.S. PATENT DOCUMENTS

| | | |
|---|---|---|
| 6,380,904 B1 | 4/2002 | Ogawa |
| 6,992,640 B2 | 1/2006 | Usami et al. |
| 7,242,365 B1 | 7/2007 | Boatman et al. |
| 7,446,730 B2 | 11/2008 | Yonemoto et al. |
| 7,463,212 B1 | 12/2008 | Ziolkowski |
| 8,059,049 B2 | 11/2011 | Quan et al. |
| 8,130,167 B2 | 3/2012 | Glabe et al. |
| 2002/0093459 A1 | 7/2002 | Butler |
| 2004/0113305 A1 | 6/2004 | Geyer |
| 2005/0190116 A1* | 9/2005 | Syed ............ H01Q 19/19 343/872 |
| 2011/0140983 A1 | 6/2011 | Hills et al. |
| 2011/0234468 A1 | 9/2011 | Omuro |
| 2012/0262331 A1 | 10/2012 | Kienzle et al. |
| 2013/0002515 A1* | 1/2013 | Hills ............ H01Q 1/42 343/872 |

OTHER PUBLICATIONS

Sung Chul Kang, International Search Report for PCT application PCT/US14/62766, Jan. 13, 2015, Korean Intellectual Property Office, Metropolitan City, Daejeon, Republic of Korea.

\* cited by examiner

BROAD BAND RADOME FOR MICROWAVE ANTENNA

BACKGROUND

Field of the Invention

This invention relates to microwave reflector antennas. More particularly, the invention relates to a cost-efficient broad band radome for a microwave reflector antenna.

Description of Related Art

The open end of a reflector antenna is typically enclosed by a radome coupled to the distal end (the open end) of the reflector dish. The radome provides environmental protection and improves wind load characteristics of the antenna. Because reflector antennas are often mounted in remote locations, such as high atop radio towers, a radome failure may incur significant repair/replacement expense.

A radome may be tuned to optimize the electrical performance of a reflector antenna, for example by dimensioning the radome surfaces to re-direct RF reflections in a desired direction. The radome materials and/or their thickness may be applied to self-cancel reflections. However, these tuned radomes then become antenna and/or operating frequency specific, requiring design, manufacture and inventory of a large collection of different radomes.

Radomes utilizing a foamed polymer material mated with at least one layer of woven (anisotropic) material providing additional strength are known, for example as missile or aircraft radomes. However, the resulting composite may be significantly stronger and/or more expensive to manufacture than required for a static earth station reflector antenna.

Competition in the reflector antenna market has focused attention on improving electrical performance and minimization of overall manufacturing, inventory, distribution, installation and/or maintenance costs. Therefore, it is an object of the invention to provide a radome that overcomes deficiencies in the prior art.

BRIEF DESCRIPTION OF THE DRAWINGS

The accompanying drawings, which are incorporated in and constitute a part of this specification, illustrate embodiments of the invention, where like reference numbers refer to the same feature or element and may not be described in detail for every drawing figure in which they appear and, together with a general description of the invention given above, and the detailed description of the embodiments given below, serve to explain the principles of the invention.

DETAILED DESCRIPTION

Figure 1:
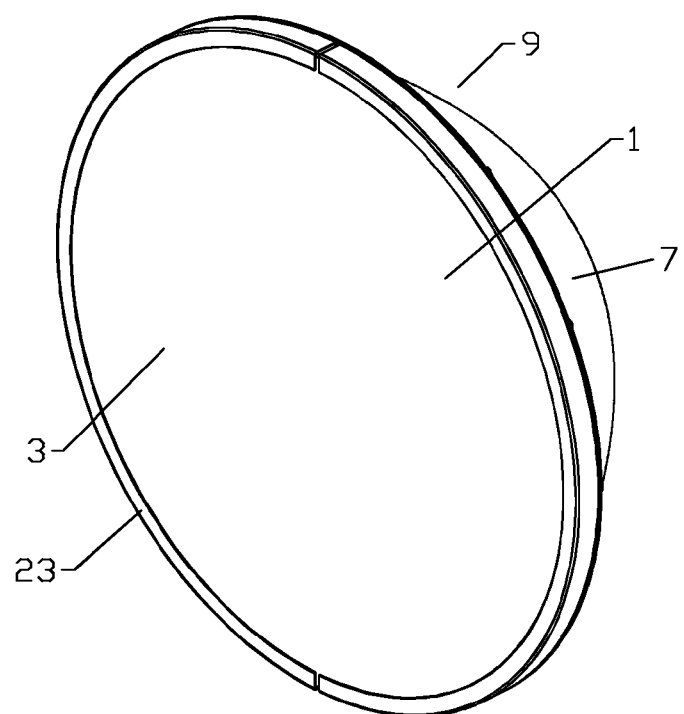
FIG. 1 is a schematic isometric angled front view of an exemplary radome mounted on the reflector dish of a reflector antenna.
Figure 2:
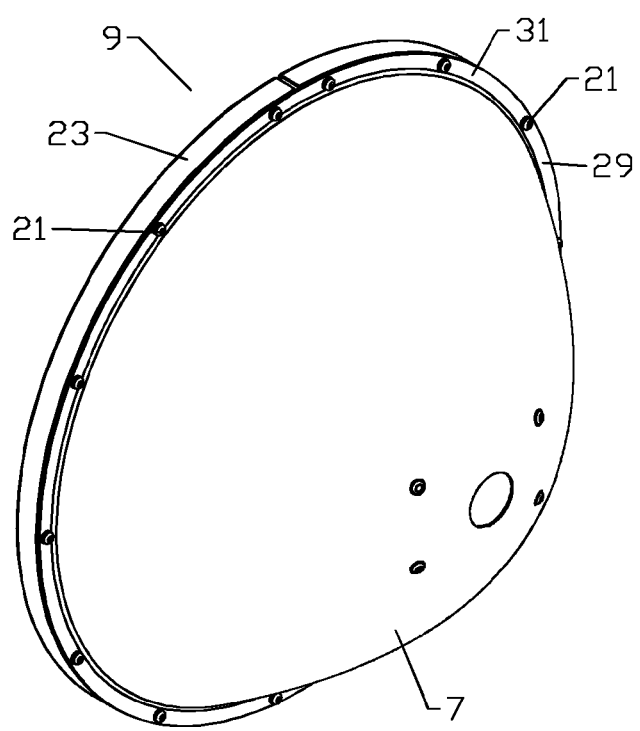
FIG. 2 is a schematic isometric angled back view of the reflector antenna of FIG. 1, antenna hub and mounting assembly removed for clarity.
Figure 3:
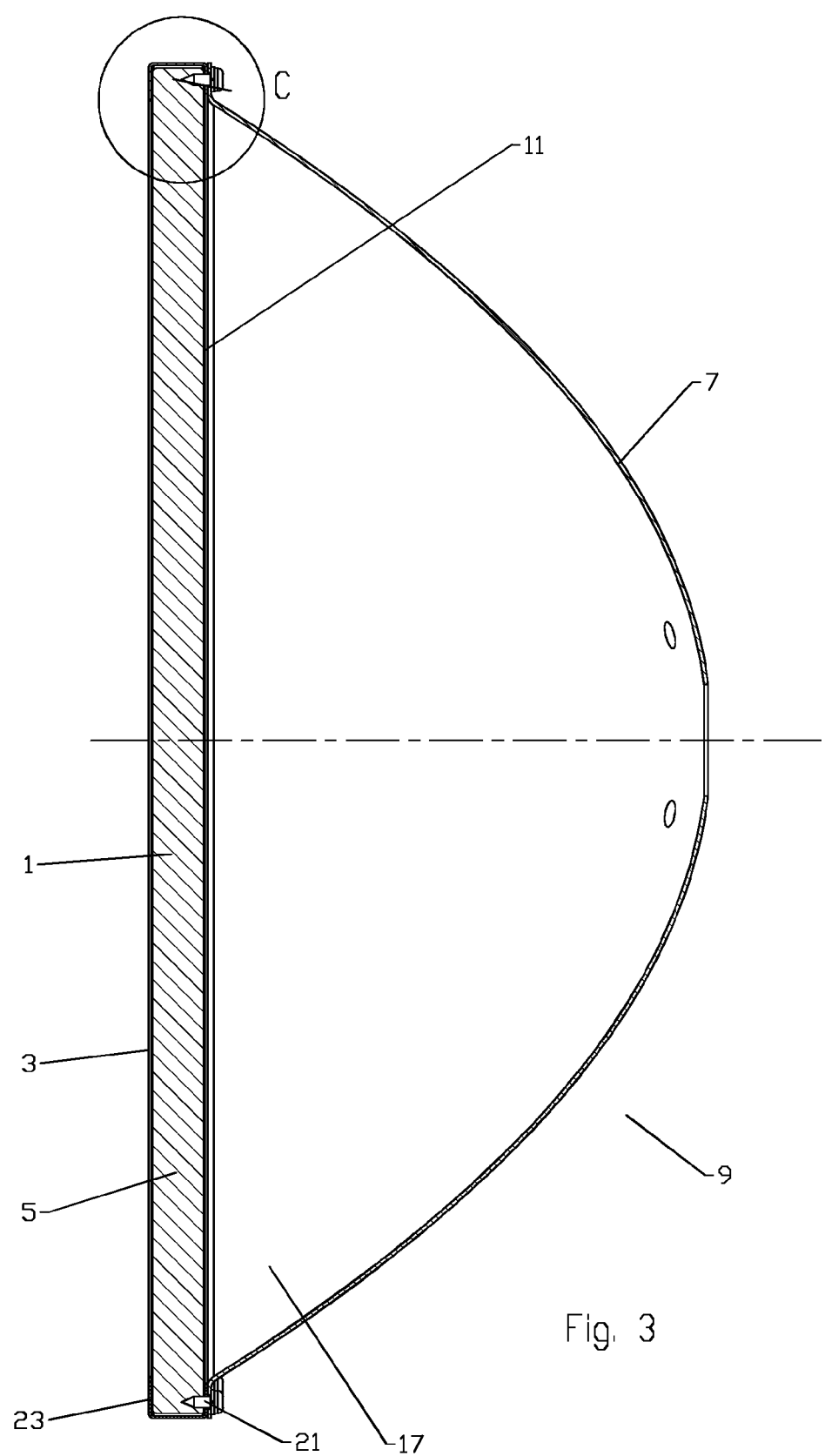
FIG. 3 is a schematic cut-away side view of the reflector antenna of FIG. 1, with the feed assembly, antenna hub and mounting assembly removed for clarity.

The inventors have recognized that a composite of a moisture resistant isotropic film outer layer and a structural layer of low density foamed polymer material can result in a radome with adequate strength which is essentially RF transparent, enabling a single radome to be utilized with a broad range of microwave frequency bands.

As shown for example in FIGS. 1-4, a radome 1 has an isotropic outer layer 3 coupled to a structural layer 5 of foam material that is retained on a reflector dish 7, enclosing an open end of the reflector antenna 9. An isotropic material as applied herein is one in which the material has a substantially homogeneous distribution. That is, the material is not a woven or fiber infused material, but a substantially uniformly distributed homogeneous material, such as a polymer film, coating or the like. The outer layer 3 may be, for example, a polymer and/or blend of polymers, such as, polycarbonate, Acrylonitrile Styrene Acrylate, Polyvinyl chloride, Polymethyl methacrylate, Thermoplastic polyolefin, Ethylene-Vinyl Acetate, Acrylonitrile Butadiene Styrene or the like.

The outer layer 3 may be a film applied upon the structural layer 5 or a coating sprayed or painted upon the structural layer 5. The outer layer 3 may provide ultra-violet and/or impact protection for the structural layer 5 as well as a moisture barrier to inhibit moisture from being absorbed into the foam material of the structural layer 5 which could otherwise degrade the structural integrity and/or electrical performance of the radome 1. Any outer layer 3 with suitable moisture and ultra-violet radiation resistance characteristics may be applied. Further, the outer layer 3 may include signage and/or graphics for aesthetics and/or marketing purposes. In a balance between moisture resistance and material cost, the outer layer 3 may be provided with a thickness of 0.5 millimeters or less.

Figure 5:
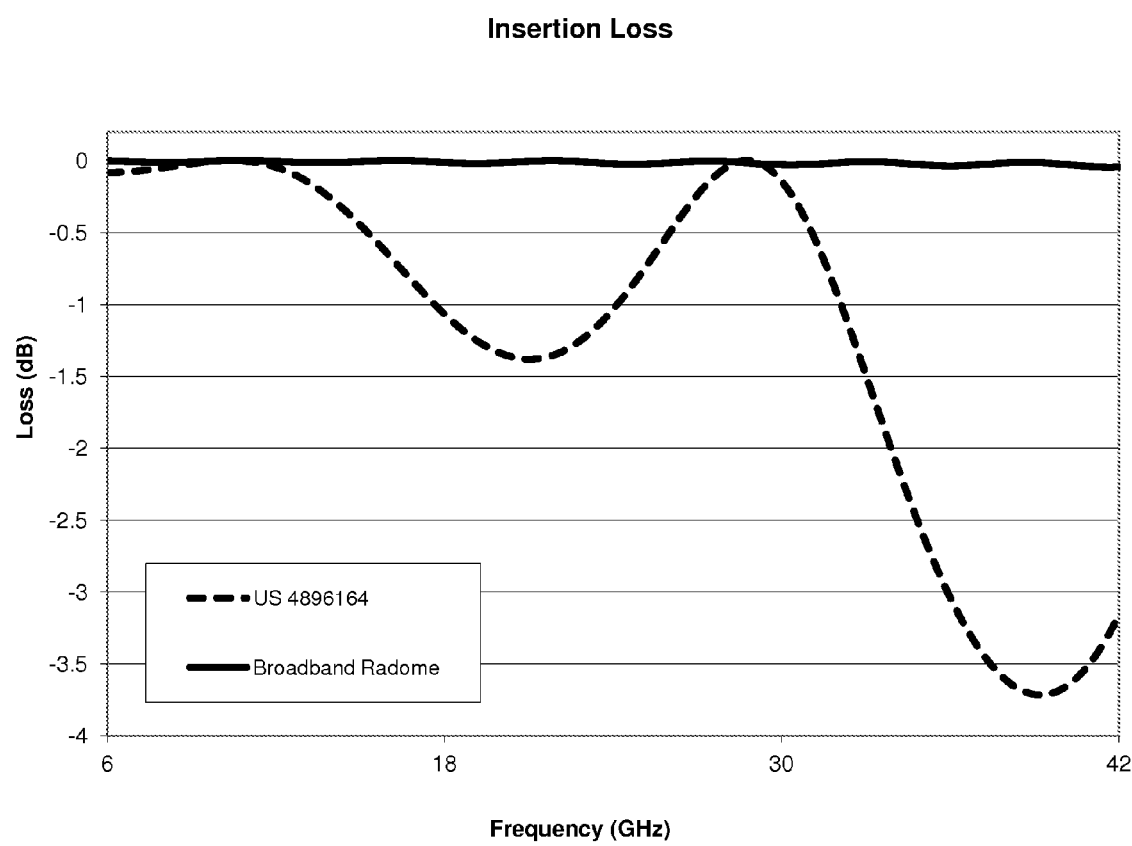
FIG. 5 is a calculated insertion loss chart comparing an exemplary radome to a prior art radome.
Figure 6:
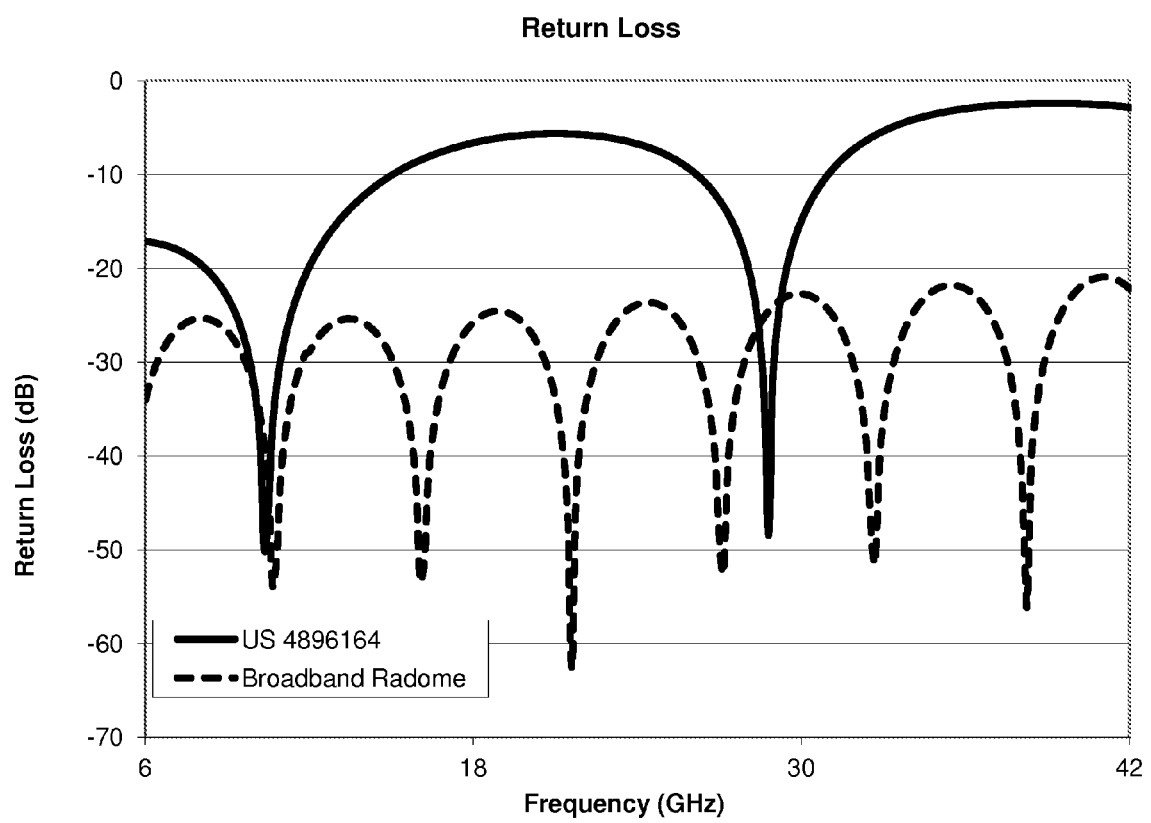
FIG. 6 is a calculated return loss chart comparing an exemplary radome to a prior art radome.

U.S. Utility Pat. No. 4,896,164, "Radar Transparent Window for Commercial Buildings", issued to Burke et al, Jan. 23, 1990, describes a conventional tuned sandwich radome structure (FIG. 2 of U.S. Pat. No. 4,896,164) with interior and exterior layers of polyester resin/E-glass (fiberglass) laminate provided on front and back sides of a rigid polyimide foam with a specific thickness selected with respect to conventional reflection cancellation. In contrast, an exemplary embodiment of a 0.1 mm thick outer layer 3 (2.8 dielectric constant) and 25 mm structural layer 5 (1.11 dielectric constant), with an uncovered signal transmission surface 11 of the inner side 13 has a significantly improved broadband characteristic with respect to insertion and return loss, as demonstrated in FIGS. 5 and 6, respectively. Notably, while the insertion loss of the exemplary embodiment composite radome is minimal over the 36 GHz range between 6 and 42 GHz, the prior tuned structure is effectively unusable outside of two narrow 4 GHz wide bands of 8-12 and 27-31 GHz.

Figure 4:
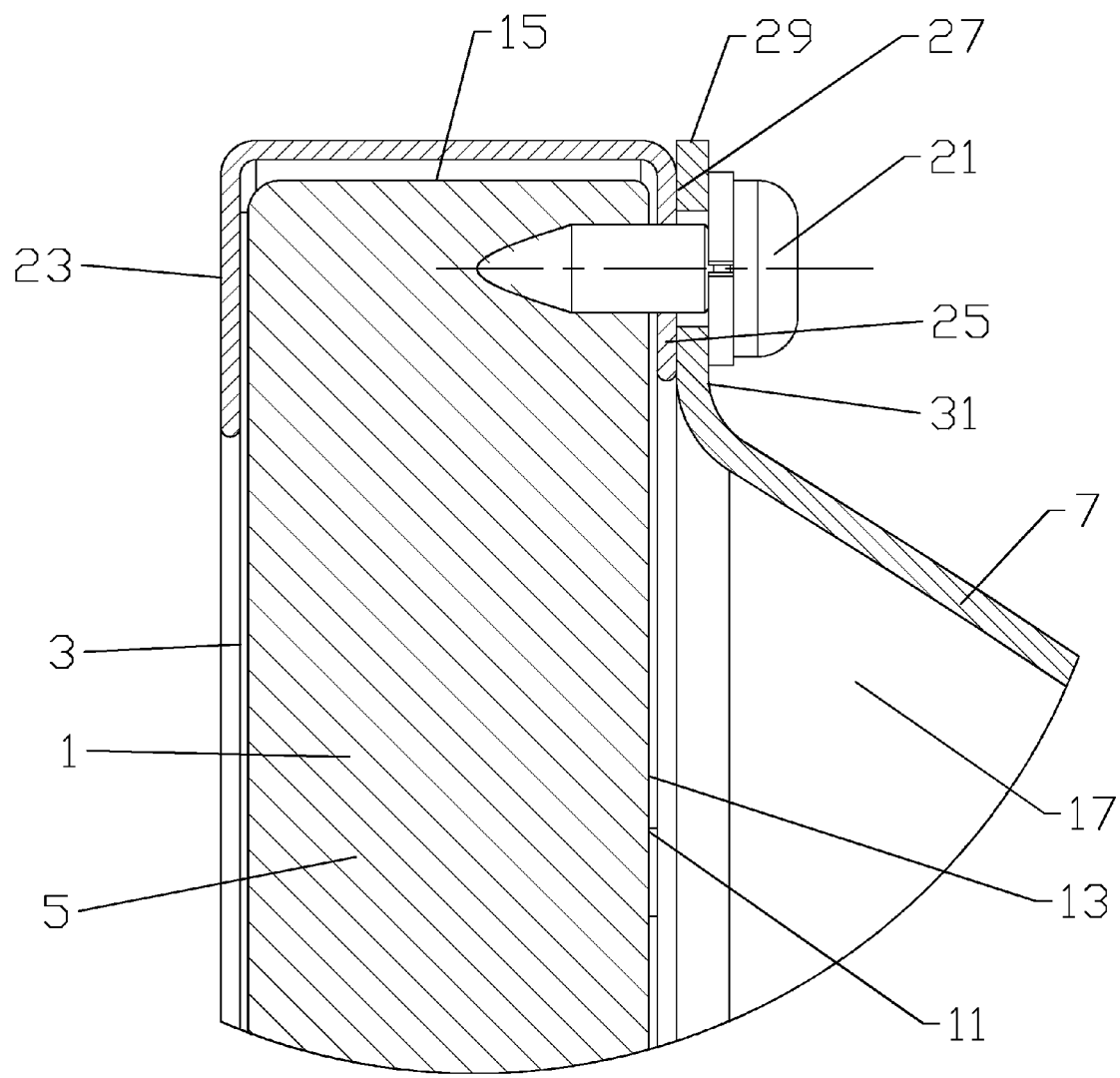
FIG. 4 is a close-up view of area C of FIG. 3.
Figure 7:
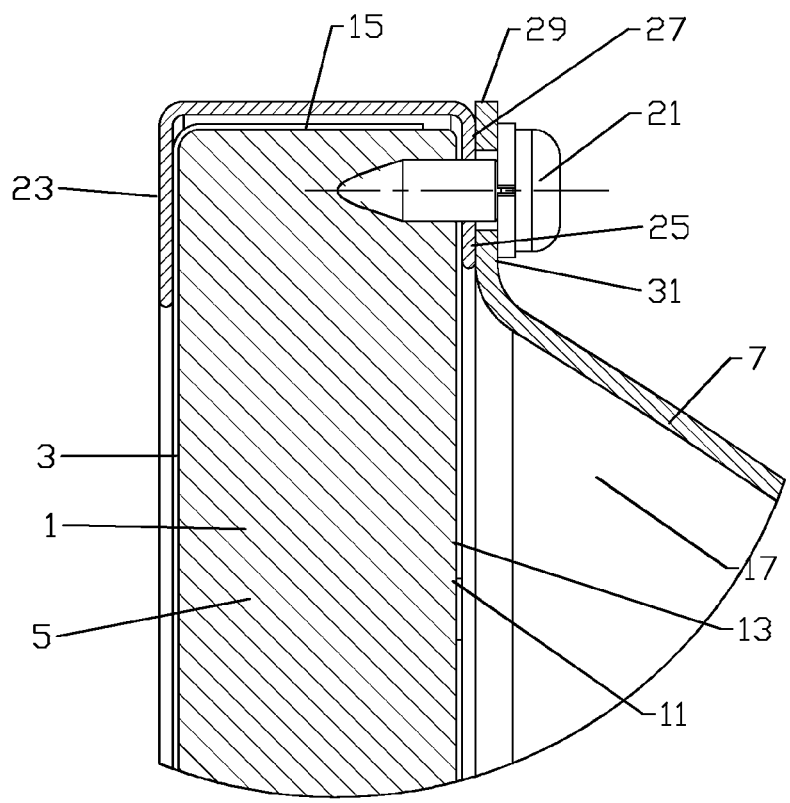
FIG. 7 is a schematic close-up view of an alternative embodiment of a radome coupled to a reflector dish, demonstrating the outer layer extending over the outer diameter of the structural layer.
Figure 8:
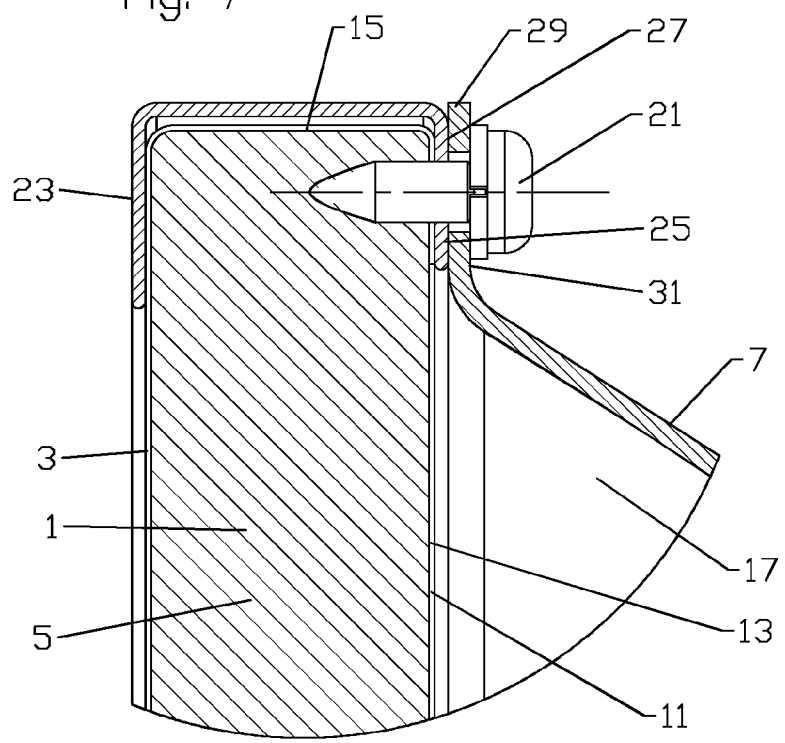
FIG. 8 is a schematic close-up view of an alternative embodiment of a radome coupled to a reflector dish, demonstrating the outer layer extending around the outer diameter to the inner side of the structural layer.

As best shown for example in FIGS. 4 and 7-8, the outer layer 3 may extend proximate to an outer diameter 15 of the structural layer 5 (FIG. 4), to the outer diameter 15 of the structural layer 5 (FIG. 7) and/or around the outer diameter 15 to the inner side 13 of the structural layer 5, without extending radially inward to the signal transmission surface 11 of the inner side 13 (FIG. 8). With the radome 1 seated upon the open end of the reflector dish 7, the reflector dish 7 provides the remainder of the moisture seal with respect to the cavity enclosed by the radome 1, so the inner side 13 of the structural layer 5, or just the signal transmission surface 11 of the inner side 13, may be uncovered.

The structural layer 5 may be provided as a foamed polymer such as polystyrene, polyurethane, polyethylene, polypropylene or the like. The structural layer 5 may be provided with a thickness selected with respect to structural properties of the selected material and/or the necessary diameter of the radome to provide a structural strength to the resulting radome 1 which corresponds to a strength and/or rigidity required for the range of environmental conditions expected at the desired reflector antenna 9 installation(s).

The structural layer 5 may be provided with a thickness from a distal end of the reflector dish 7 of at least 2 wavelengths of a minimum operating frequency, such that a conductive retaining element 23 or conductive edge 41 applied at the radome periphery is also operative as a shield portion inhibiting generation of backlobes in the signal pattern of the resulting antenna 9.

Figure 9:
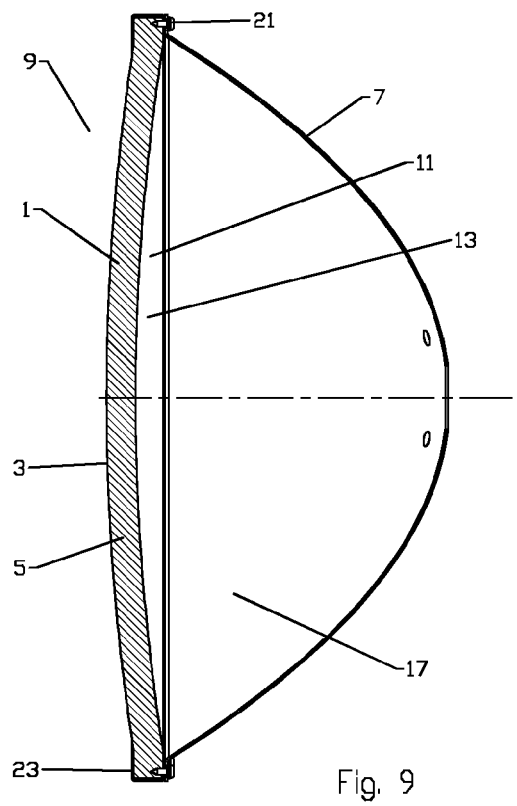
FIG. 9 is a schematic cut-away side view of an alternative embodiment of a radome coupled to a reflector antenna, demonstrating a domed antenna profile. The feed assembly, antenna hub and mounting assembly have been removed for clarity.
Figure 10:
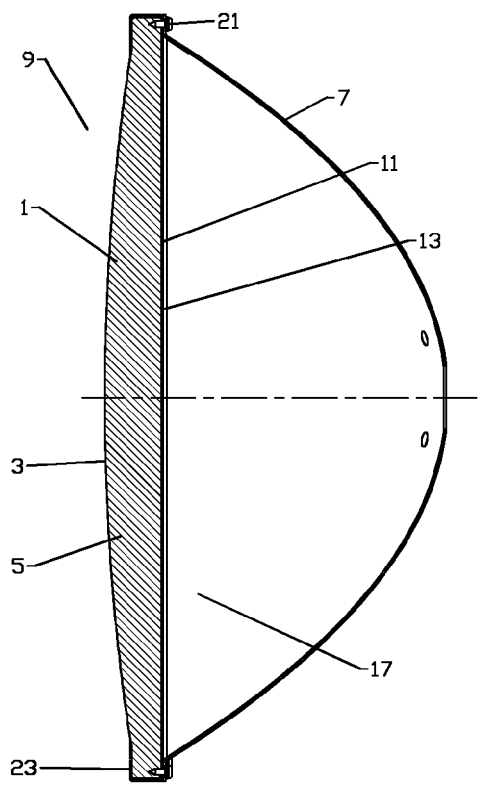
FIG. 10 is a schematic cut-away side view of an alternative embodiment of a radome coupled to a reflector antenna, demonstrating a domed radome profile. The feed assembly, antenna hub and mounting assembly have been removed for clarity.
Figure 11:
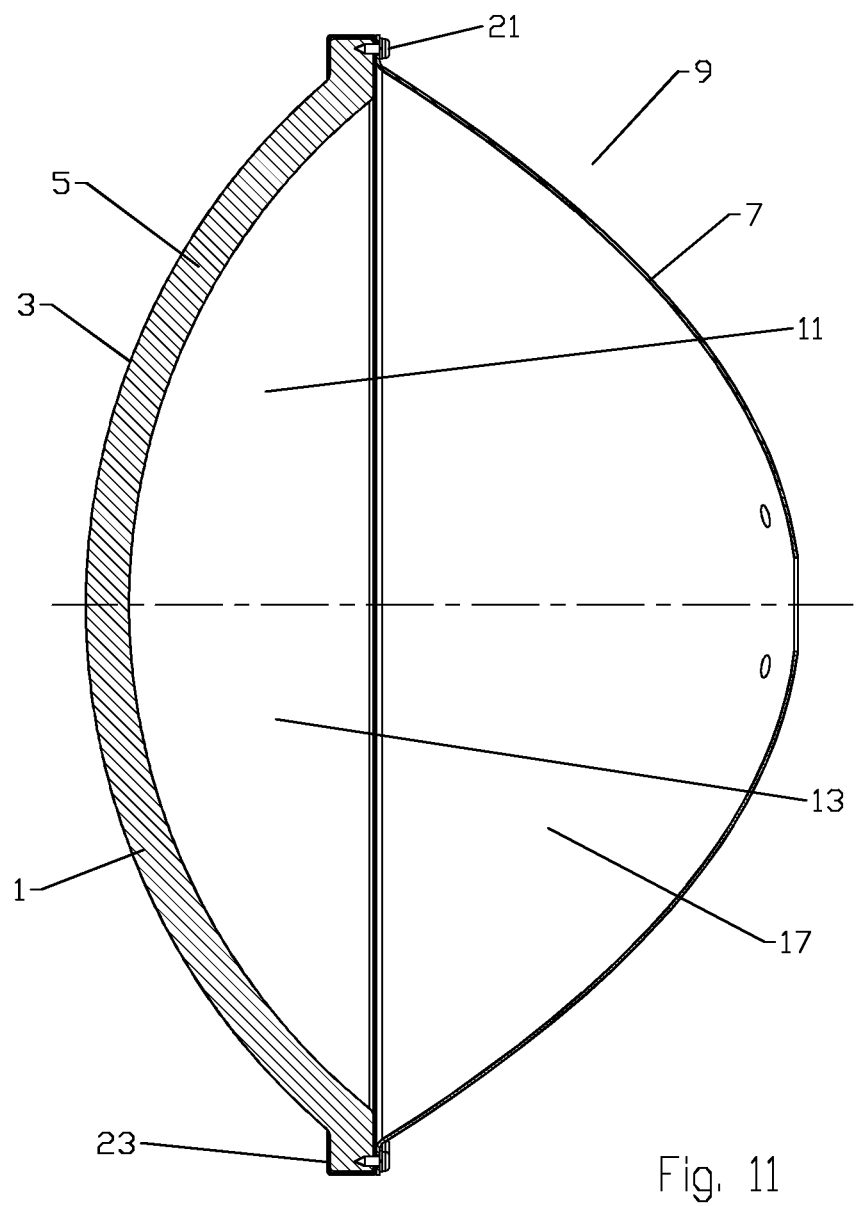
FIG. 11 is a schematic cut-away side view of an alternative embodiment of a radome coupled to a reflector antenna, demonstrating a domed radome profile. The feed assembly, antenna hub and mounting assembly have been removed for clarity.
Figure 12:
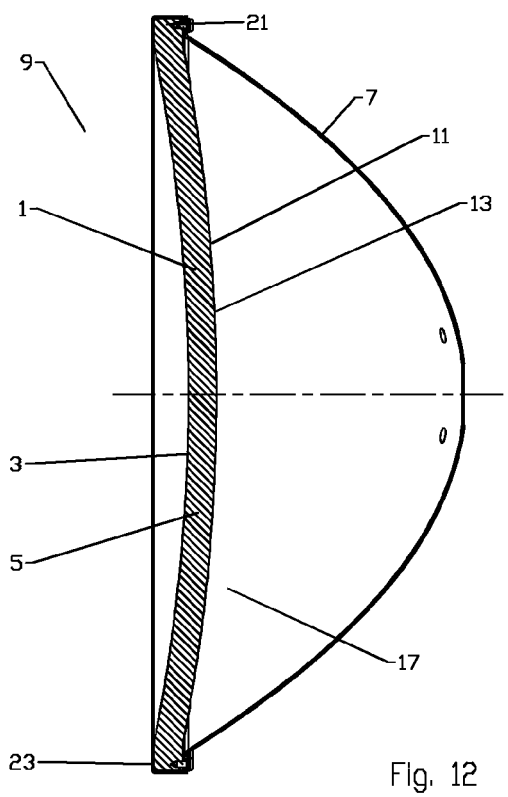
FIG. 12 is a schematic cut-away side view of an alternative embodiment of a radome coupled to a reflector antenna, demonstrating an inwardly domed radome profile. The feed assembly, antenna hub and mounting assembly have been removed for clarity.
Figure 13:
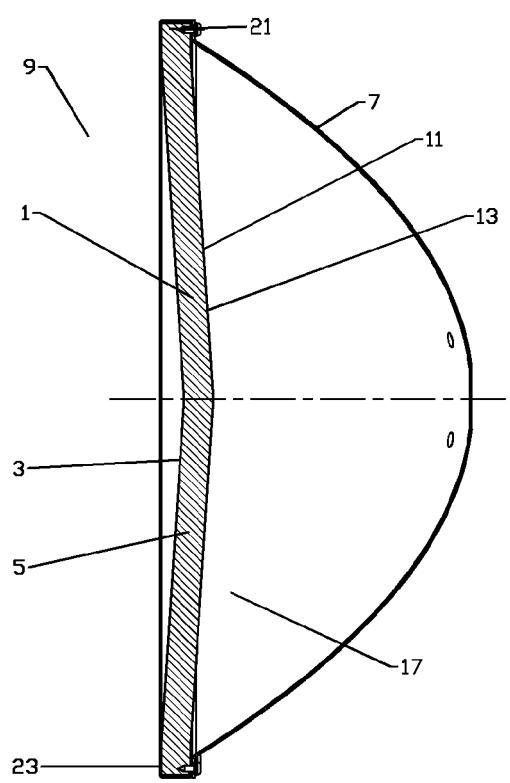
FIG. 13 is a schematic cut-away side view of an alternative embodiment of a radome coupled to a reflector antenna, demonstrating an inwardly conical radome profile. The feed assembly, antenna hub and mounting assembly have been removed for clarity.
Figure 14:
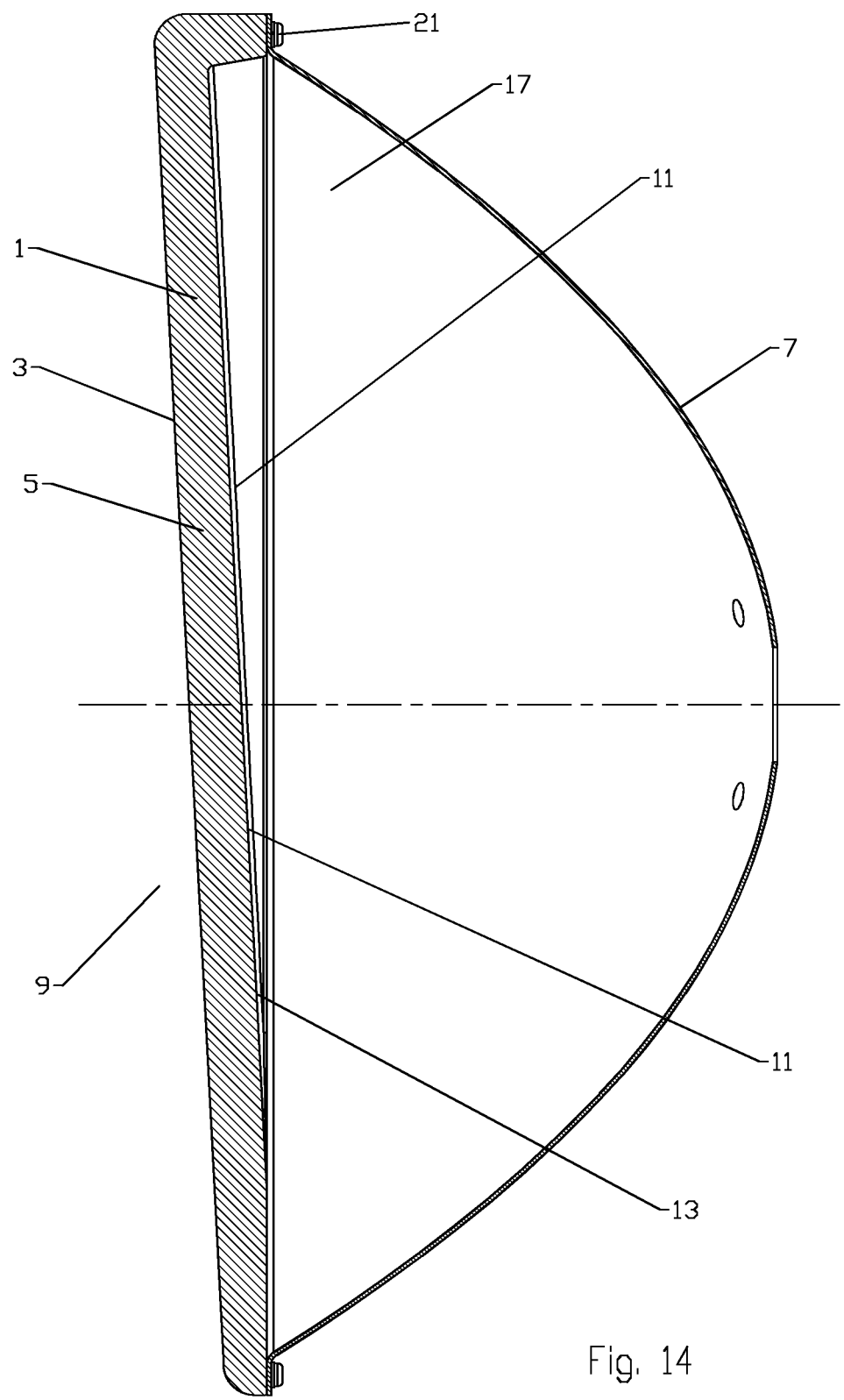
FIG. 14 is a schematic cut-away side view of an alternative embodiment of a radome coupled to a reflector antenna, demonstrating an angled planar face radome profile. The feed assembly, antenna hub and mounting assembly have been removed for clarity.

The foamed polymer of the structural layer 5 may be cut to size or cost efficiently molded with a high level of precision, in any desired profile. For example, the radome 1 may be provided with a profile configured to extend inwardly or outwardly to further reduce return loss, enhance wind loading, and/or improve the strength characteristics of the radome. A domed profile may be applied wherein the center of the radome arcs outwardly or inwardly from the periphery of the radome, for example as shown in FIGS. 9-12. The inner side 13 of the radome 1 may be provided flat (FIG. 10) or with a corresponding outward or inward arc (FIGS. 9, 11 and 12). Alternatively, the inward or outward extension of the radome 1 may be conical, for example as shown in FIG. 13, and/or the radome 1 may be provided with an angled face plane, for example as shown in FIG. 14, to improve both ice shedding and return loss characteristics of the reflector antenna 9.

Figure 15:
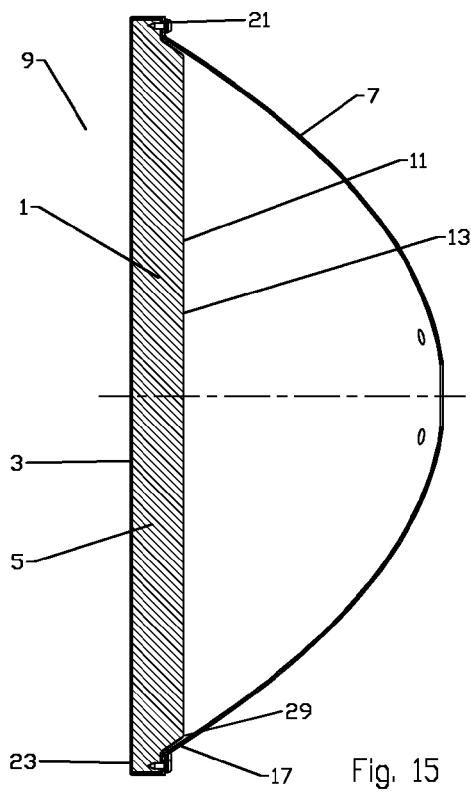
FIG. 15 is a schematic cut-away side view of an alternative embodiment of a radome coupled to a reflector antenna, demonstrating a structural layer projecting inwardly to the signal space of the reflector dish. The feed assembly, antenna hub and mounting assembly have been removed for clarity.
Figure 16:
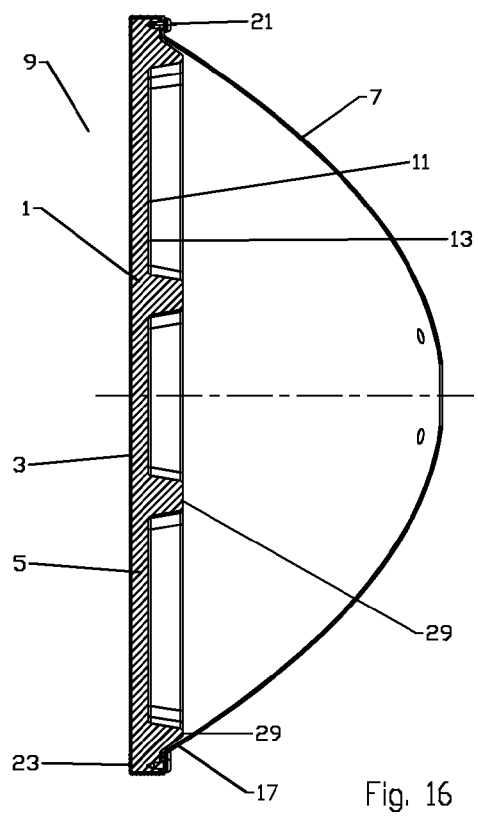
FIG. 16 is a schematic cut-away side view of an alternative embodiment of a radome coupled to a reflector antenna, demonstrating a structural layer projecting inwardly to the signal space of the reflector dish. The feed assembly, antenna hub and mounting assembly have been removed for clarity.

To enable an increased thickness of the structural layer 5, for example for enhanced strength characteristics, without extending the outer dimensions of the reflector antenna 9, the inner side 13 of the structural layer 5 may be provided with one or more inward projections 19, dimensioned to extend inwardly from the distal end of the reflector dish 7, seating also along the inner signal surface 17 of the reflector dish 7, for example as shown in FIGS. 15 and 16. To minimize material requirements of the thickened structural layer 5, the inward projections 19 of the structural layer 5 may be applied as reinforcing rings and/or ribs, for example as shown in FIG. 16, which extend inwardly of a plane of a retaining flange 29 of the reflector dish 9 of the antenna.

Figure 17:
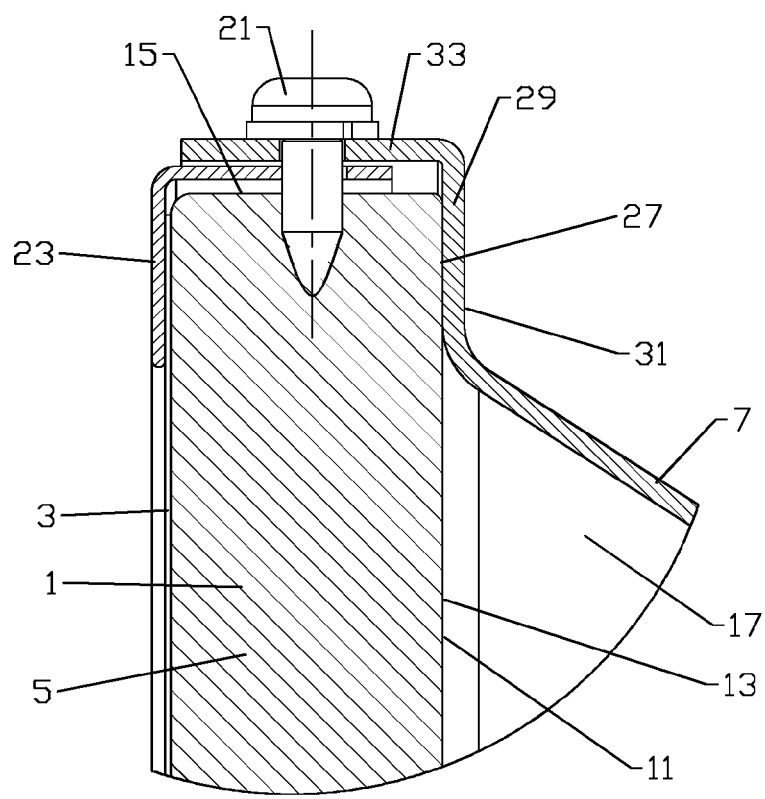
FIG. 17 is a schematic close-up view of an alternative embodiment of a radome coupled to a reflector dish, demonstrating a retaining flange with a periphery portion.
Figure 18:
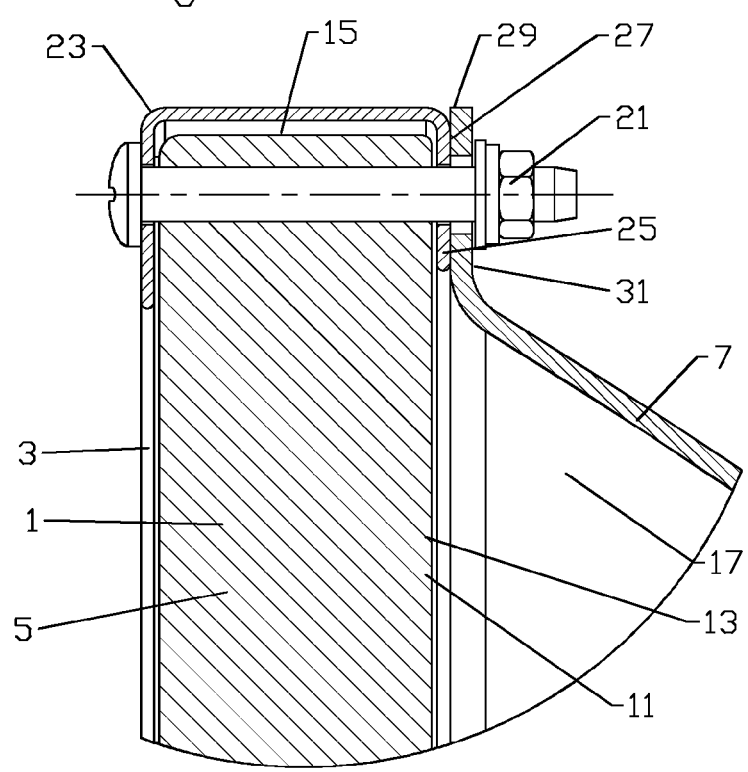
FIG. 18 is a schematic close-up view of an alternative embodiment of a radome coupled to a reflector dish, demonstrating through fastening between the retaining flange and the retaining element.

As shown for example in FIG. 4, the radome 1 may be coupled to the reflector dish 7 via fasteners 21 such as screws or the like which retain the radome directly upon the distal end of the reflector dish 7 and/or which secure a retaining element 23, such as a metal band, which may protect the periphery of the radome 1 and/or further secure the radome 1 in place. The fasteners 21 may extend through the retaining element 23 and into the structural layer 5 (FIGS. 4, 17) or fully through the structural layer 5 and two edges of the retaining element 23 (FIG. 18).

Figure 19:
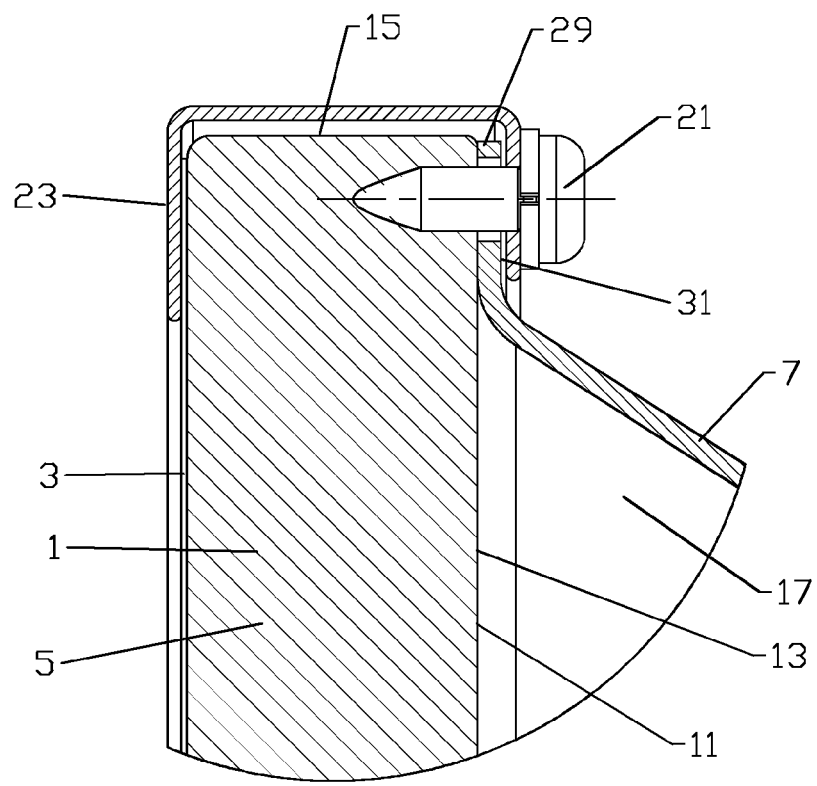
FIG. 19 is a schematic close-up view of an alternative embodiment of a radome coupled to a reflector dish, demonstrating overlapping of the retaining flange and the retaining element.

The retaining element 23 may be applied with an outer edge 25 seated against an outer surface 27 of the retaining flange 29 of the reflector dish 7, for example as shown in FIG. 4. Alternatively, the retaining element 23 may seat against an inner seat surface 31 of the retaining flange 29 (FIG. 19), providing an overlapping mechanical interlock between the elements and extending the path required for signal leakage to occur therebetween. The retaining flange 29 may be formed with a periphery portion 33 coaxial with a longitudinal axis of the reflector antenna 9, enabling the retaining element 23 to be provided with an "L" rather than "C" cross-section, the retaining element 23 retained by fasteners 21 extending radially inwardly through the periphery portion 33 into the retaining element 23 and further into the radome 1, as shown for example in FIG. 17.

Figure 20:
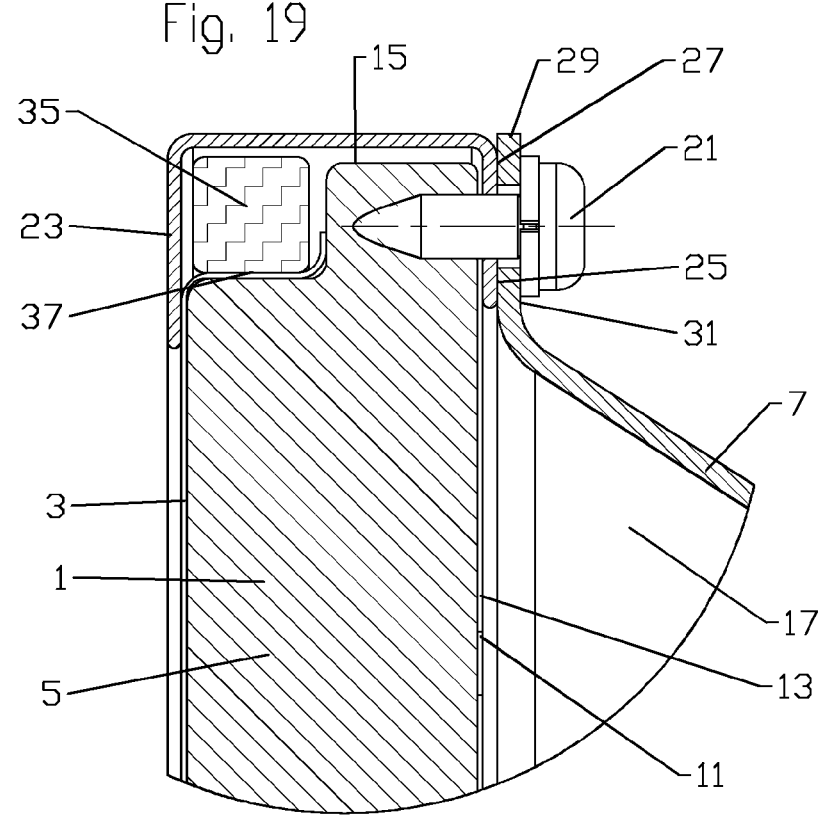
FIG. 20 is a schematic close-up view of an alternative embodiment of a radome coupled to a reflector dish, demonstrating an RF absorber seated in a periphery shoulder of the structural layer.
Figure 21:
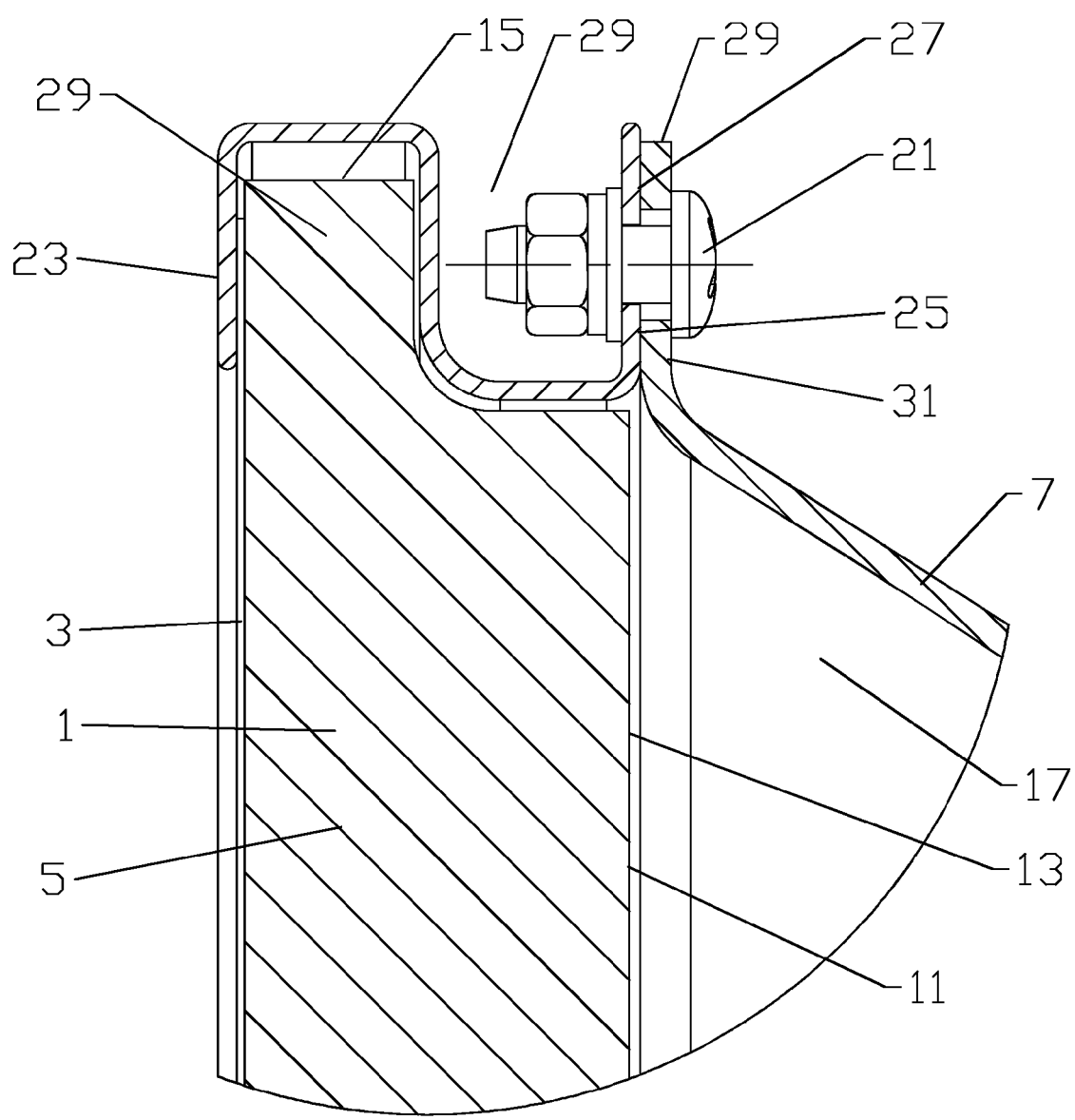
FIG. 21 is a schematic close-up view of an alternative embodiment of a radome coupled to a reflector dish, demonstrating a retaining element with an S-shaped cross-section with inner and outer choke grooves.

The retaining element 23 may also be utilized to retain an RF absorber 35 seated in a periphery shoulder 37 of the radome 1, for example as shown in FIG. 20. The retaining element 23 may be further provided in a generally S-shaped cross-section, dimensioned to provide both an inward and an outward facing choke groove 39 for inhibiting back lobes in the resulting reflector antenna signal pattern, for example as shown in FIG. 21. In addition to electrical performance benefits, this configuration also enables a fastener 21 (provided, for example, as a bolt and nut) to avoid penetrating the structural layer or a signal area of the radome 1, which may avoid secondary sealing issues created by multiple fasteners 21 penetrating through the retaining element 23 into the signal area of the radome 1 itself.

Figure 22:
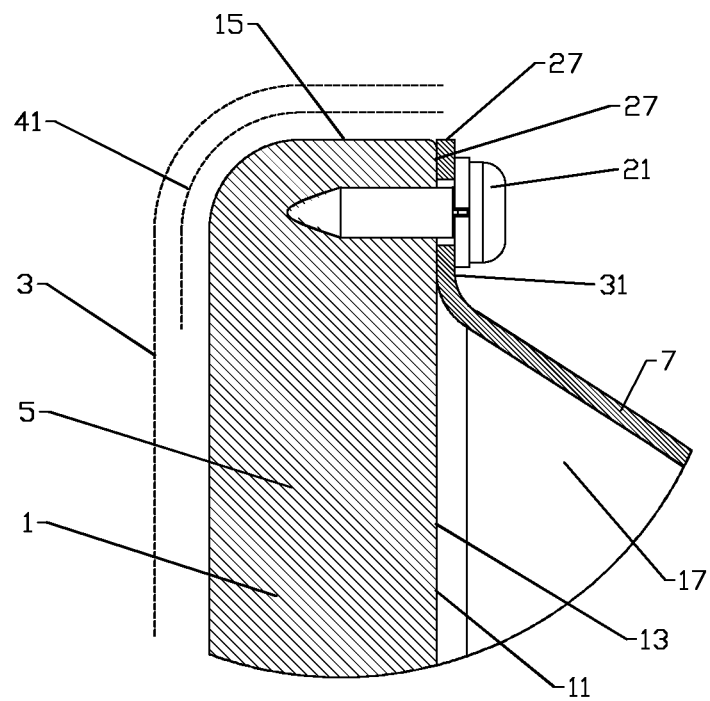
FIG. 22 is a schematic close-up view of an alternative embodiment of a radome coupled to a reflector dish, demonstrating a radome coupled without a retaining element, with a conductive groove and the outer layer represented separate from the structural layer for clarity.
Figure 23:
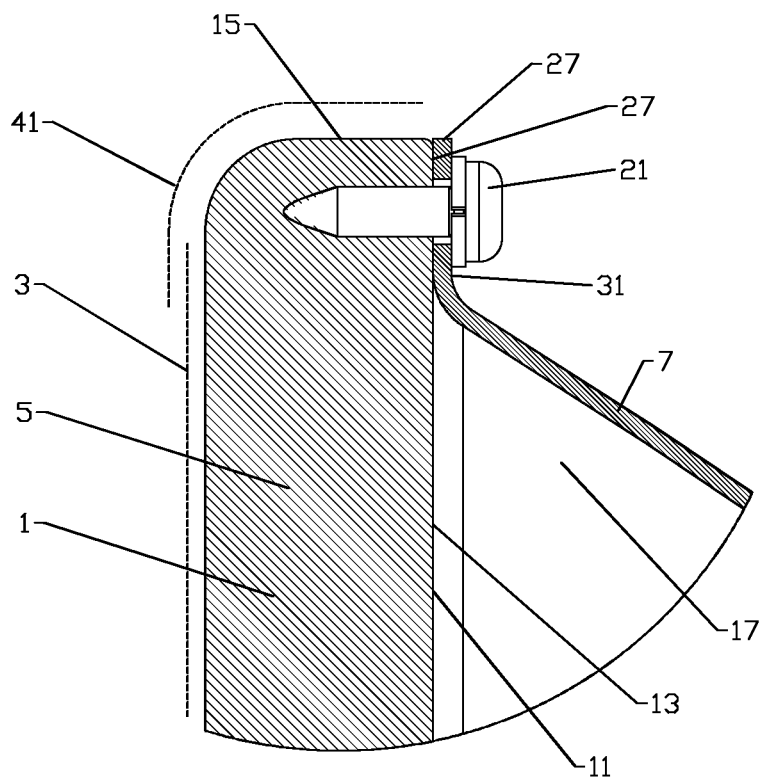
FIG. 23 is a schematic close-up view of an alternative embodiment of a radome coupled to a reflector dish, demonstrating a radome coupled without a retaining element, with a conductive groove and the outer layer represented separate from the structural layer for clarity.

The radome 1 may also be retained on the distal end of the reflector dish, without an additional retaining element 23. Where the retaining element 23 is omitted, a conductive edge 41, formed for example via metalizing, electrodaging, overmolding, metallic paint, foil or the like, may be applied to assist with signal pattern backlobe cancellation either on top of or under the outer layer 3, for example as shown in FIGS. 22 and 23.

The bonding of the outer layer 3 to the structural layer 5 may be secured, for example by application of an adhesive therebetween and/or integrally with a molding/foaming process of the structural layer 5. For example, an initial molding of the structural layer 5 may be performed and the mold opened for insertion of the outer layer 3. Alternatively, the outer layer 3 may be applied via spraying, either upon the mold or upon the structural layer 5. With the outer layer 3 in place, the mold may be closed again and final molding/foaming completed with an additional time period. Alternatively, the outer layer 3 may be inserted or sprayed into an empty mold and the structural layer 5 molded upon it. Thereby, the composite of the structural layer 5 and outer layer 3 may be formed without use of an additional adhesive. Similarly, the mold may include vacuum-forming functionality to draw the outer layer 3 into the desired extent, either in a separate operation or via vacuum forming the thin film of the outer layer 3 in situ within the mold before the structural layer 5 is foamed on top of it.

Alternatively, the outer layer 3 may be heat shrunk upon the structural layer 5.

One skilled in the art will appreciate that the ability to provide a single cost efficient radome 1, usable on a wide range of operating frequency bands, may enable significant reflector antenna manufacturing cost efficiencies. Further, the self supporting characteristic of the structural layer enables simplified radome to reflector antenna attachment arrangements with electrical performance enhancing characteristics that may also be cost effective and/or easily adaptable to a wide range of different reflector dishes 7.

Although demonstrated via embodiments of Cassegrain reflector antennas, one skilled in the art will appreciate that concepts embodied in the broadband radome 1 may be similarly applied to alternative antenna arrangements also requiring the environmental protection afforded by a radome 1, such as panel and/or horn antennas and the like, with similar benefits and cost efficiencies.

| Table of Parts | |
|---|---|
| 1 | radome |
| 3 | outer layer |
| 5 | structural layer |
| 7 | reflector dish |
| 9 | reflector antenna |
| 11 | signal transmission surface |
| 13 | inner side |
| 15 | outer diameter |
| 17 | inner signal surface |
| 19 | inward projection |
| 21 | fastener |
| 23 | retaining element |
| 25 | outer edge |
| 27 | outer surface |
| 29 | retaining flange |
| 31 | inner seat surface |
| 33 | periphery portion |
| 35 | RF absorber |
| 37 | periphery shoulder |
| 39 | choke groove |
| 41 | conductive edge |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A radome for an antenna, comprising:
a composite of an isotropic outer layer and a structural layer of foam material, wherein the isotropic outer layer is directly applied to the structural layer via molding and wherein the composite is dimensioned for enclosing an open end of the antenna;
a retaining element dimensioned to couple a periphery of the radome to the antenna, wherein the retaining element is provided with an s-shaped cross section forming choke grooves; and
fasteners passing through the retaining element and a retaining flange of a reflector dish, without contacting the structural layer.

2. The radome of claim 1, wherein the isotropic outer layer has a thickness of 0.5 millimeters or less.

3. A radome for an antenna, comprising: a composite of an isotropic outer layer and a structural layer of foam material, wherein the composite is dimensioned for enclosing an open end of the antenna, and wherein the isotropic outer layer extends around an outer diameter of the structural layer.

4. The radome of claim 3, wherein a signal transmission surface of an inner side of the structural layer is uncovered.

5. The radome of claim 3, wherein the structural layer is one of polystyrene, polyurethane, polyethylene and polypropylene.

6. The radome of claim 3, wherein the isotropic outer layer is a coating upon the structural layer.

7. The radome of claim 3, wherein the isotropic outer layer is a film coupled to the structural layer.

8. The radome of claim 3, wherein the radome has a domed profile with a planar inner side.

9. The radome of claim 3, wherein the radome has an inner projection, the inner projection extending inwardly of a plane of a retaining flange of a reflector dish of the antenna.

10. The radome of claim 9, wherein the inner projection also seats along an inner signal surface of the reflector dish.

11. The radome defined in claim 3, wherein the isotropic outer layer is molded onto the structural layer.

12. A radome for an antenna, comprising: a composite of an isotropic outer layer and a structural layer of foam material, wherein the composite is dimensioned for enclosing an open end of the antenna;
   further comprising an RF-absorbing element located at a periphery of the radome and overlying the isotropic outer layer.

13. The radome of claim 12, wherein a signal transmission surface of an inner side of the structural layer is uncovered.

14. The radome of claim 12, wherein the structural layer is one of polystyrene, polyurethane, polyethylene and polypropylene.

15. The radome of claim 12, wherein the isotropic outer layer is a coating upon the structural layer.

16. The radome of claim 12, wherein the isotropic outer layer is a film coupled to the structural layer.

17. The radome of claim 12, wherein the radome has a domed profile with a planar inner side.

18. The radome of claim 12, wherein the radome has an inner projection, the inner projection extending inwardly of a plane of a retaining flange of a reflector dish of the antenna.

19. The radome of claim 18, wherein the inner projection also seats along an inner signal surface of the reflector dish.

20. The radome of claim 12, wherein the isotropic outer layer extends around an outer diameter of the structural layer to an inner side of the structural layer, without extending radially inward into a signal transmission surface of the inner side of the structural layer.

* * * * *